C. M. BOYCE

METHOD OF FINISHING PRINTS

Sept. 15, 1931.

Original Filed May 28, 1929

Re. 18,192

2 Sheets-Sheet 1

Inventor

BY Charles M. Boyce

Banning & Banning

ATTORNEYS

C. M. BOYCE

METHOD OF FINISHING PRINTS

Sept. 15, 1931.

Original Filed May 28, 1929

Re. 18,192

2 Sheets-Sheet 2

INVENTOR.

Charles M. Boyce

BY

Banning & Banning

ATTORNEYS

Reissued Sept. 15, 1931 Re. 18,192

UNITED STATES PATENT OFFICE

CHARLES M. BOYCE, OF CEDAR RAPIDS, IOWA, ASSIGNOR, BY MESNE ASSIGNMENTS, TO JOHN R. DITMARS, OF NEW YORK, N. Y.

METHOD OF FINISHING PRINTS

Original No. 1,725,699, dated August 20, 1929, Serial No. 366,760, filed May 28, 1929. Application for reissue filed April 21, 1931. Serial No. 531,787.

An object of this invention is to provide a method of finishing ink prints which are made by any one of a number of well known methods of printing so as to give them brilliancy, depth of tone and surfaces of matte, semi-matte or gloss, such as is possessed by photographic prints.

This and other objects as will hereinafter appear are accomplished by this invention, which is fully described in the following specification and shown in the drawings, in which—

The embodiment illustrated comprises mechanism for finishing prints which is particularly adapted to be used with the printing apparatus shown and described in my pending application Serial No. 320,783, of which application Serial No. 351,432, filed March 30, 1929, was a division, and of which divisional application the present application is a continuation in part.

The continuous paper or other base strip E′ emerging from the printing mechanism feeds into the finishing mechanism shown herein where the imprinted base is coated and dried, as will later be described.

Figure 1:
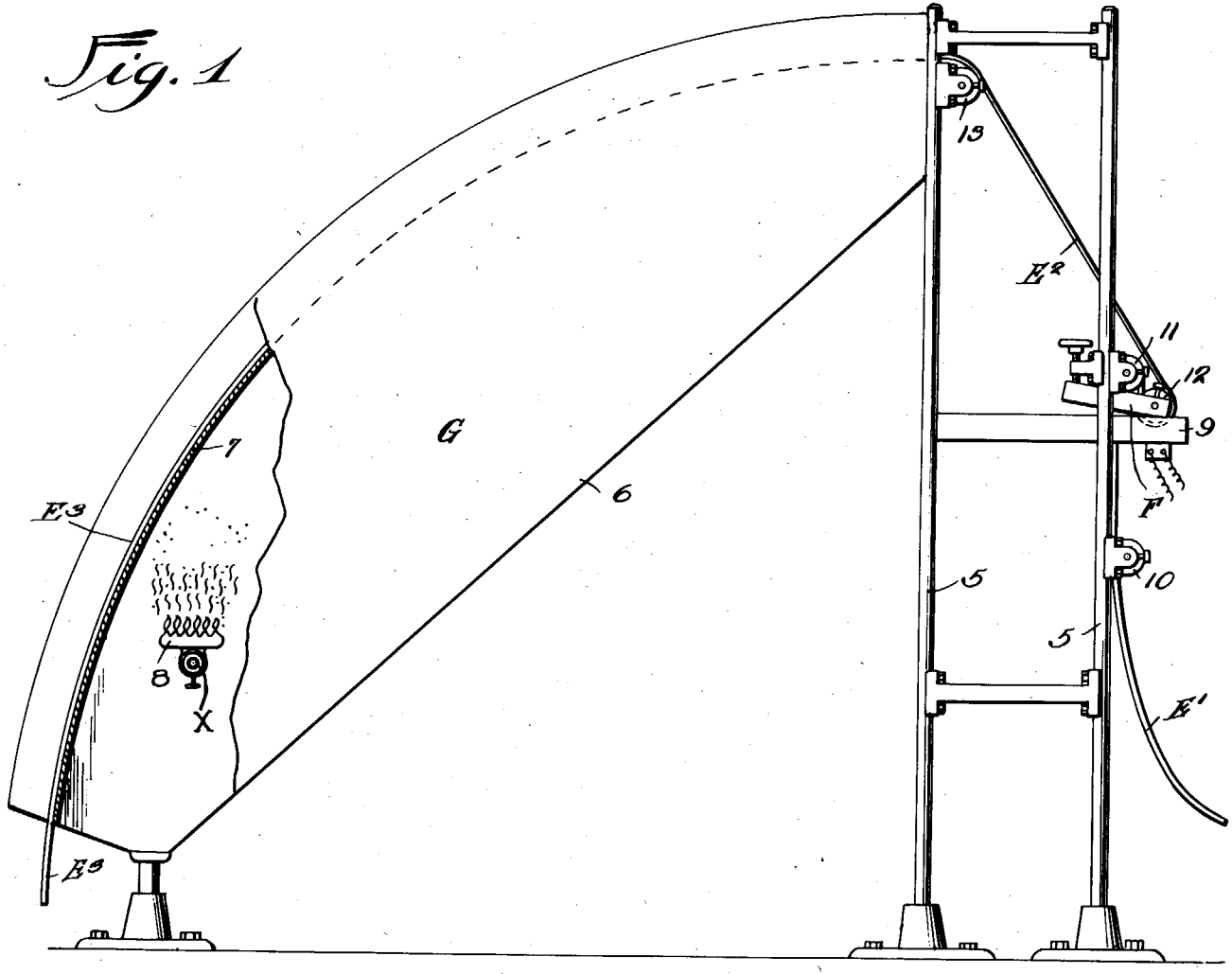
Figure 1 is a side elevation of a treating and drying mechanism for the paper as it emerges from the printing mechanism.
Figure 2:
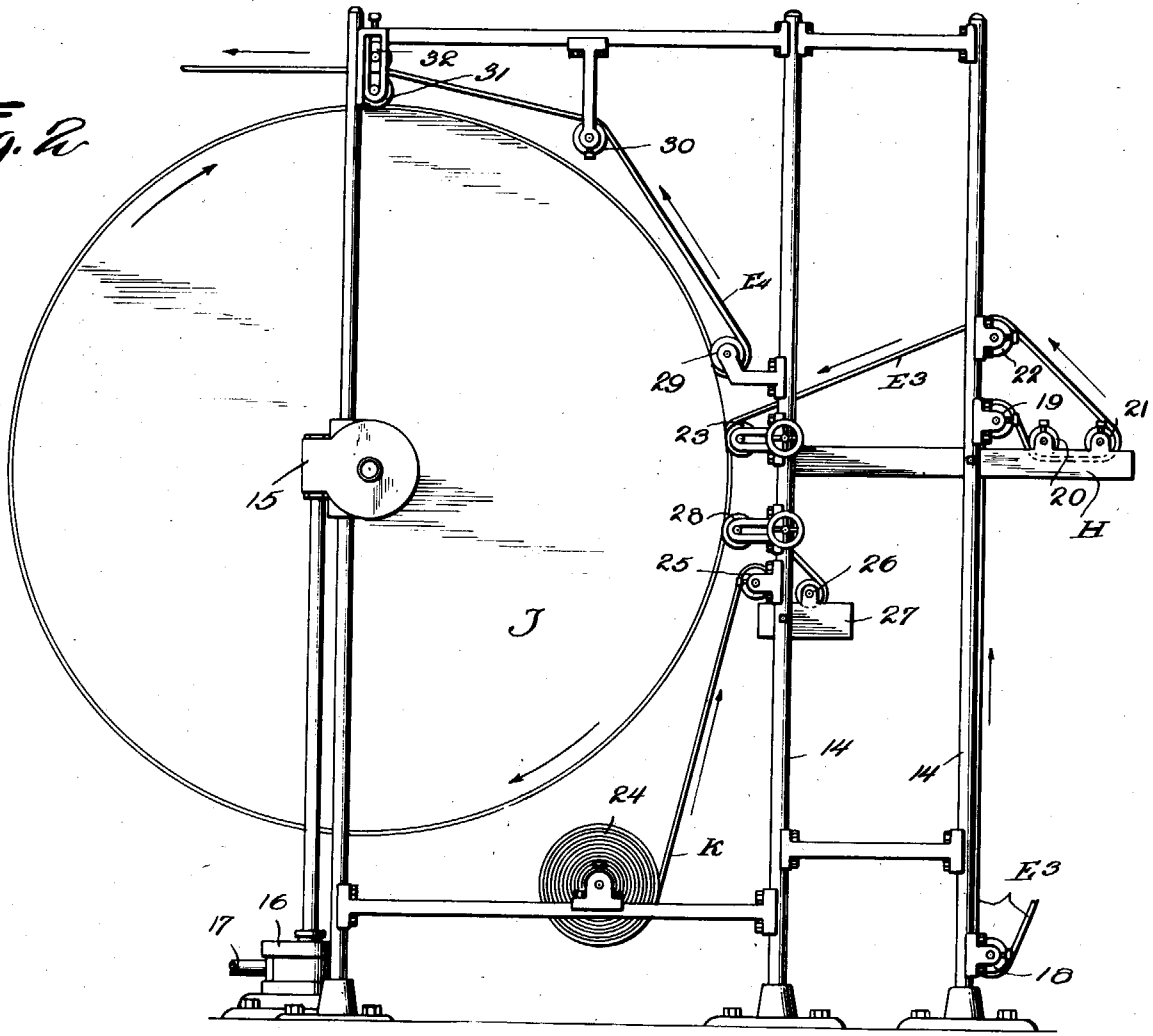
Fig. 2 is the side elevation of an enameling drum which receives paper from the drying frame of Fig. 1.

Fig. 1 shows the coating and drying mechanism, while Fig. 2 shows the enameling or finishing drum. The hereinafter described mechanism comprises a frame 5 to which is attached a drying frame or housing 6 of sheet metal, or the like, having a surface 7 over which the paper strip $E^3$ passes. The surface 7 is shown as curved to prevent the edges of the paper curling up as it dries. A gas burner or other heating element 8 is placed within the sheet metal housing 6, and the heating of the frame may be controlled by any suitable means such as, for instance, the valve X.

The frame 5 carries a suitably heated pan 9 in which a film-forming solution, later to be described, is maintained at about 120° F. and which is to be applied to the imprinted face of the paper strip E′.

It will be understood that the ink prints which have been made by the machine described in my co-pending application Serial No. 320,783 are preferably of the continuous tone type and such a machine is intended primarily for use with collo-type or swelled-gelatine plates, but appropriate half-tone plates can also be used, also plates made by photogravure, and transfer processes or photographing down as used in offset printing, and prints made by any of these processes may be surfaced and finished by the mechanism which is now being described.

The paper strip E′ which has previously been printed by any of the foregoing processes may be passed up under the roller 10, over the roller 11, and down under the roller 12, which submerges the entire width of the paper strip in the coating solution in the pan 9. For this purpose the roller 12 is considerably narrower than the width of the paper strip E′. The coating solution, due to the capillary attraction, will permit this strip to be submerged some distance beneath its surface without overflowing upon the back thereof.

As the paper strip $E^2$ with its surface film emerges from the pan 9, it passes up over the roller 13 and slides around the back 7 of the drier G emerging at the bottom as a dried strip $E^3$ which passes over a series of rollers and eventually reaches the enameling or finishing drum J, shown in Fig. 2. This is mounted upon a frame 14, and is driven, preferably by means of worms and worm wheels within the housings 15 and 16. The worm shaft 17 connects with a motor or other suitable source of power (not shown). It is obvious that the mechanisms just described should be operated at a speed corresponding to that of the printing machine with which such mechanisms are coordinated. Ordinarily such printing machines, as are referred to herein, are run at a constant speed. To reach the drum J, the sheet of coated and dried paper $E^3$ passes under the roller 18, thence up over the roller 19, and down under the rollers 20 and 21. As the strip passes under the latter rollers it is brought into contact with a surface of alcohol and water or other suitable moistening medium which would put the coated surface of the paper in condition for enameling or finishing.

As the paper strip emerges from the bath of the moistening medium H it passes up over the roller 22, and over the roller 23, which latter forces the treated surface of the coating into intimate contact with the cylindrical surface of the enameling drum J. A suitable distance is provided between the roller 20 and the roller 21 to permit the liquid in the bath H to sufficiently permeate the coating on the paper so that when it is brought into contact with the highly polished surface of the drum J it will make intimate contact therewith, the roller 23 acting as a squeegee roller to force the treated surface into perfect contact with the polished surface of the drum.

For some purposes it is desired to provide the strip of paper with a backing of cloth, or the like. Such a backing of gummed cloth K may be provided by taking it from the roll of cloth 24 and passing it up over the roller 25, down under the roller 26 which dips the cloth into a bath of liquid 27, thence up over the roller 28 which forces it firmly against the back of the paper strip. The rollers 23 and 28 are provided with adjustable means whereby the pressure applied thereon may be varied to suit conditions.

The enameling or finishing drum J revolves in a clockwise direction and the coating of the strip $E^3$ which has been previously treated to make intimate contact with the surface of the drum, has time to thoroughly dry in expanded conditions by the time the drum revolves to carry the strip beneath the stripping roller 29. This roller 29 strips the paper strip off the face of the drum, after which the enameled and dried paper strip $E^4$ passes up over the roller 30, and out between the rollers 31 and 32. From here the paper strip passes on to a trimmer, or the like.

With the apparatus just described any desired type of photographic finish on ink imprinted sheet or web bases may be obtained, such as matte, semi-matte, or gloss, but it will be understood that my invention is not limited to any one kind of print or finish but involves such a relation of appropriate paper, print, depth of coating, nature of coating composition, and finishing or any selection of these elements, so controlled and coordinated as to produce mechanical prints hardly distinguishable from true photographs.

It will be further understood that when matte-semi-matte or like photographic finishes are desirable, the coating permeating step may be dispensed with as the depth or thickness of the layer of film-forming solution is primarily the determining factor. It is desirable, however, in most cases, as herein described, to have the coating slightly damp when passing onto the drum J so that the final drying may be carefully controlled and the coating dried in expanded condition. If desired the degree of heat may be so controlled within the housing 6 of the drier G as to leave the film on the strip E′ in a slightly moist condition when it leaves the drier for final drying on the drum J as above explained; or the drum J may be dispensed with and the heat so controlled in the housing 6 that the strip E′ emerges from the drier completely dried, ready for trimming and separating, it being understood that the nature and consistency of the coating material must be carefully controlled to produce the finish desired.

While we may use soluble cellulose or the cellulose esters, in which I include the nitrocelluloses as well as the acetates, formates, and other esters, and of the nitro-celluloses, the mononitrocellulose in particular, the truly desirable and workable formulæ for the employment of this invention are as follows:

*Formula for compound for coating with gelatin*

| | |
|---|---|
| Water 60 ounces<br>Gelatin (hard) 5 oz. | A |
| Water 20 ounces<br>Formaldehyde (about 37%) 2½ oz. | B |
| Glycerine 7½ ounces—C | |
| Water 10 ounces<br>Methyl or ethyl alcohol 10 ounces | D |

Add B to A very slowly, then add C, at once, and then D, keeping the temperature at about 120° F.

Assuming the above formula is for coating for gloss finish, and matte or semi-matte is desired, dilute with distilled water until you have the required consistency to give the required depth of film.

With reference to the above formula it will be noted that a very large percentage of formaldehyde is employed when the gelatin and water are considered in proportion to each other, which formaldehyde operates to produce a film of sufficient hardness to prevent adherence of the film to the finishing drum. Now in order to employ such a percentage of formaldehyde as to produce the desired hardness of film, it has been found material to employ a sufficiently large percentage of glycerine or suitable agent as to materially retard the action between the formaldehyde and gelatin. This retarding action is sufficient to cause the solution to remain uniform in consistency for a considerable period of time while without the retarder the rate of change in consistency of the solution is so great as to prevent uniform coating.

*Formula for solution for coating with soluble cotton (pyroxylin) and gelatin mixture*

| | |
|---|---|
| Soluble cotton 1 ounce<br>Glacial acetic acid 15 ounces | G |
| Gelatin 2½ ounces<br>Glacial acetic acid 15 ounces | H |

To use take two parts of G and one part H, and if gloss is not sufficient use a little more of H, being careful not to use too much. For semi-matte and matte, dilute to proper consistency with glacial acetic acid.

The solution is used cold. The color is translucent but becomes crystal clear when dry.

The addition of the gelatin to the soluble cotton is for the purpose of producing a gloss and the advantage secured through the use of soluble cotton and gelatin is to provide rapid drying. It will be understood that the percentage of gelatin added to secure the degree of gloss wanted is relatively small, as primarily the depth or thickness of film determines the resultant finish.

*Formula for solution for coating with soluble cotton (pyroxylin) coating for matte and semi-matte*

| | |
|---|---|
| Soluble cotton 1 ounce<br>Amyl acetate 20 ounces | E |
| Methyl or ethyl alcohol 5 ounces<br>Pure gum camphor ¼ ounce<br>Castor oil 1 ounce | F |

Add F to E and reduce to proper consistency with methyl or ethyl alcohol. Should the film absorb moisture while drying and a whitish blush appear on the print, substitute amyl acetate for a part of the alcohol.

From the foregoing it will be seen that a very efficient and effective means is provided for producing prints having the depth, brilliancy and surface of contact photographic prints, and which so closely resemble true photographs of the various kinds herein referred to as to defy identification by anyone but an expert.

While I have shown and described but a single embodiment of my invention, it is to be understood that it is capable of many modifications. Changes, therefore, in the construction and arrangement may be made which do not depart from the spirit and scope of my invention as disclosed by the appended claims.

I claim:

1. The continuous process of producing prints simulating photographs, comprising coating an ink imprinted continuous strip base with a layer of transparent colloidal film-forming solution, the consistency of the film-forming solution being predetermined and controlled for gauging the thickness of film to produce any desired surfaces from matte to gloss.

2. The continuous process of producing prints simulating photographs, comprising applying to an ink imprinted continuous strip base a coating of transparent colloidal film-forming solution, and drying the imprinted base, the nature and consistency of the film-forming solution, the amount used, and the drying conditions being predetermined and controlled according to the matte or gloss finish desired.

3. The continuous process of producing prints simulating photographs which includes producing a substantially continuous tone ink impression upon a suitable continuous strip base, coating the imprinted base with a layer of transparent colloidal film-forming solution, the consistency of the film-forming solution being predetermined and controlled for gauging the thickness of film to produce any desired surfaces from matte to gloss.

4. The continuous process of producing prints simulating photographs which includes producing a substantially continuous tone ink impression upon a suitable web, coating the ink imprinted web with a layer of transparent colloidal film-forming solution, the nature and consistency of the film-forming solution being predetermined and controlled according to the matte or gloss finish desired.

5. The continuous process of producing prints simulating photographs which includes producing a substantially continuous tone ink impression upon a suitable web, coating the ink imprinted web with a layer of transparent colloidal film-forming solution, and drying the coated web, the nature and consistency of the film-forming solution, the amount used, and the drying conditions being predetermined and controlled according to the matte or gloss finish desired.

6. The continuous process of producing prints simulating photographs which includes producing a substantially continuous tone ink impression upon a suitable continuous strip base, coating the imprinted base with a layer of transparent colloidal film-forming solution, the consistency of the film-forming solution appalied to the base being predetermined and controlled for gauging the thickness of film to produce surfaces from matte to gloss, and drying the coated base under predetermined and controlled conditions.

7. The continuous process of producing prints simulating photographs which includes producing a substantially continuous tone ink impression upon a suitable web, coating the ink imprinted web with a layer of transparent colloidal film-forming solution, the nature and consistency of the film-forming solution applied to the imprinted base being predetermined and controlled according to the matte or gloss finish desired, and drying the coated imprinted base under controlled conditions determined by the nature and the consistency of the film-forming solution employed.

8. The continuous process of producing prints simulating photographs which includes imprinting a substantially continuous tone ink impression directly on a suitable continuous strip base, coating the impression with a layer of transparent colloidal film-forming solution, rapidly drying the coating, moistening the dried coating and again drying it in contact with a finishing drum.

9. The process of treating an imprinted base to produce prints simulating photographs, comprising subjecting the imprinted base in continuous succession to the steps of a coating process including the application of a transparent film formed from a combination including gelatin, formaldehyde and glycerine, and drying the coated base under controlled conditions determined by the nature and consistency of the coating composition.

10. The process of treating an imprinted base to produce prints simulating photographs comprising subjecting the imprinted base to a coating process including the application of a film-forming solution containing gelatin, formaldehyde and glycerine in excess of that required for flexibility to retard action between the gelatin and formaldehyde.

11. The continuous process of treating an imprinted base to produce prints simulating photographs, comprising subjecting the imprinted base to a coating process including the application of a film-forming solution containing gelatin, formaldehyde and glycerine in such proportion as to retard action between the formaldehyde and gelatin at the particular concentration of solution used.

12. The continuous process of producing prints simulating photographs with any desired surface finish ranging from matte to gloss, comprising coating an ink imprinted web with a layer of transparent colloidal film-forming solution of such a nature and thickness as to produce any desired finish ranging from matte to gloss according to the thickness of the layer.

13. The continuous process of producing prints simulating photographs with any desired surface finish ranging from matte to gloss which includes producing a substantially continuous tone ink impression upon a suitable web, coating the imprinted web with a layer of transparent colloidal film-forming solution of such a nature and thickness as to produce any desired finish ranging from matte to gloss according to the thickness of the layer.

14. The continuous process of producing prints simulating photographs with any desired surface finish ranging from matte to gloss which includes producing a substantially continuous tone ink impression upon a suitable web, coating the imprinted web with a layer of transparent colloidal film-forming solution of such a nature and thickness as to produce any desired finish ranging from matte to gloss according to the thickness of the layer, and drying the coated web under predetermined and controlled conditions.

15. The article produced by the process covered in claim 12.

16. The process of treating an imprinted base to produce prints having accentuated depth and brilliance with a controlled surface varying from matte to gloss comprising a continuous succession of steps wherein the base is subjected to a coating process including the application of a transparent colloid film-forming solution of a nature and consistency predetermined and controlled according to the surface desired with the base employed and drying the coated base under predetermined and controlled conditions.

17. The process of treating an imprinted base to produce prints having accentuated depth and brilliance with a controlled surface varying from matte to gloss comprising a continuous succession of steps wherein the base is subjected to a coating process including the application of a transparent protein containing film-forming solution of a nature and consistency predetermined and controlled according to the surface desired and drying the coated base under predetermined and controlled conditions.

18. The process of treating an imprinted base to produce prints having accentuated depth and brilliance with a controlled surface varying from matte to gloss comprising a continuous succession of steps wherein the base is subjected to a coating process including the application of a transparent protein containing film-forming solution of a nature and consistency predetermined and controlled according to the surface desired, said solution containing a hardener and a constituent for retarding the hardening action thereof, and drying and enameling the coated base.

19. The process of treating an imprinted base to produce good prints having accentuated depth and brilliance with a controlled surface varying from matte to gloss comprising a continuous succession of steps wherein the base is subjected to a coating process including the application of a transparent protein-containing film forming solution of a nature and consistency predetermined according to the surface desired, said solution containing a hardener and a constituent for retarding the hardening action thereof, partially drying the coated base and contacting the partially dried coated base with a highly polished heated metal surface.

CHARLES M. BOYCE.